H. THOMAS.
SLICE SUPPORT FOR MEAT SLICING MACHINES.
APPLICATION FILED NOV. 2, 1908.
932,189.
Patented Aug. 24, 1909.
2 SHEETS—SHEET 1.
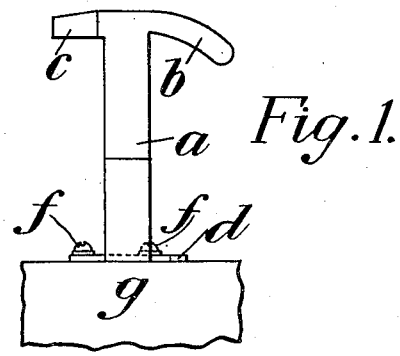
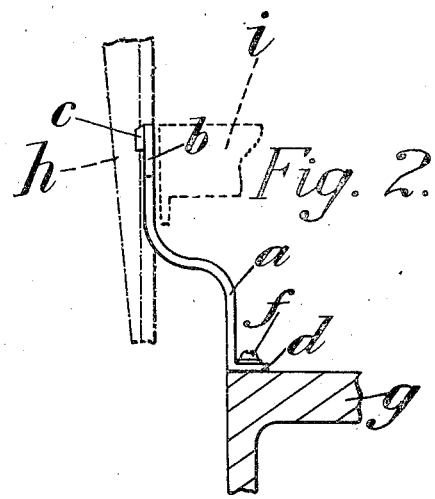
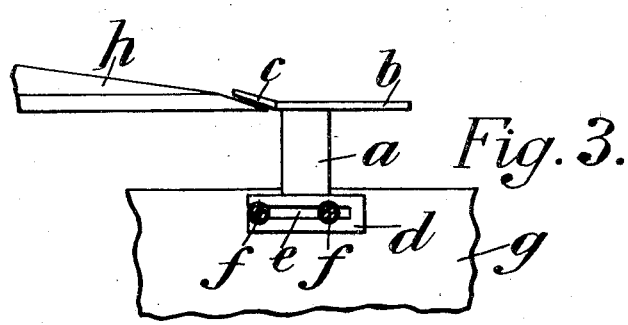

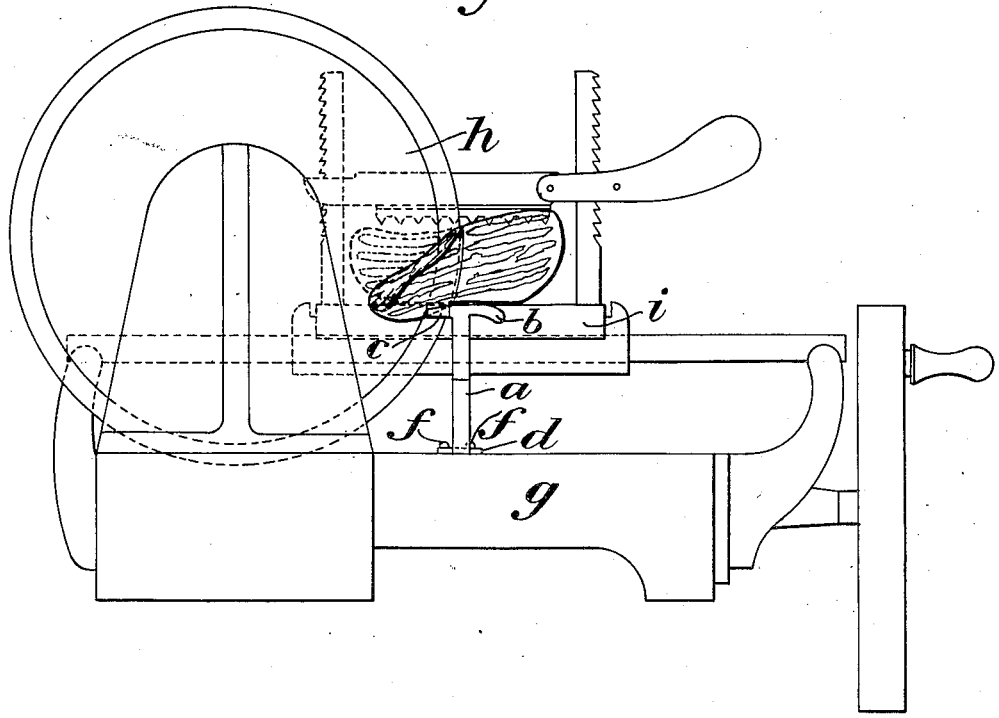

UNITED STATES PATENT OFFICE.

HENRY THOMAS, OF LONDON, ENGLAND.

SLICE-SUPPORT FOR MEAT-SLICING MACHINES.

932,189.  Specification of Letters Patent.  Patented Aug. 24, 1909.

Application filed November 2, 1908. Serial No. 460,609.

*To all whom it may concern:*

Be it known that I, HENRY THOMAS, residing at London, England, a subject of the King of Great Britain, have invented a certain new and useful Slice-Support for Meat-Slicing Machines, of which the following is a specification.

This invention relates to meat slicing machines having rotary cutting knives and it has for its object to provide means whereby the slice or rather the skin thereof is supported while being cut.

In machines at present in use when slicing meats with soft skin, and especially if the knife is not kept properly sharpened by the user, there is a tendency for the skin to rag, that is, to not be properly severed, and in order to support the skin of the meat during the cutting operation I, under my invention, provide a simple device which is arranged at the side of the meat plate or table of the machine and is secured to the base thereof and is capable of adjustment thereon.

The support is particularly advantageous when cutting, so called, wet meats or green bacon having a soft skin.

In order that my invention may be properly understood I have hereunto appended an explanatory sheet or drawings, whereon:—

Figure 1 is a front elevation of the support. Fig. 2 is an end elevation thereof. Fig. 3 is a plan thereof. Fig. 4 is a view of an entire slicing machine with the device applied thereto.

As shown on the drawing the support, which is secured to the base $g$ (shown broken away) or other suitable fixed part of the machine and immediately in advance of and in line with the rotating cutting knife $h$ (shown broken away) consists of a bracket $a$ having a cross piece or head $b$ which, at one end thereof, is curved downward and, at the other end thereof, is angled outward parallel to the bevel at the back of the knife, as shown at $c$. At its lower end the bracket $a$ is provided with a foot $d$ having a longitudinal slot $e$ therein through which screws $f$ are passed so as to secure the foot to the base $g$. By loosening the screws $f$ the support can be nicely adjusted to the edge of the knife with which it, as shown at Fig. 3, is in line. The knife is indicated in dotted lines at $h$ Fig. 2. The meat plate or table upon which the meat is carried is shown broken away at $i$ Fig. 2 and it will be seen that the edge of the support is close up to the edge of the table.

The head $b$ of the support need not be very broad as it has only to support the slice while being cut so that the latter may have a clean cutting action and sever the skin without ragging the same.

Having now fully described my invention what I claim and desire to secure by Letters Patent is:—

1. In a meat slicing machine means for supporting the slice while being cut so that the skin thereof shall be properly severed consisting of a bracket having a cross head one part of which is curved downwardly and another part angled outwardly and means for attaching the bracket to a fixed part of the machine.

2. In a meat slicing machine means for supporting the slice while being cut so that the skin thereof shall be properly severed consisting of a bracket having, at its lower end, a slotted foot said bracket being bent and provided, at its upper end, with a cross piece one part of which is bent downwardly and another part bent outwardly.

In testimony whereof I affix my signature in presence of two witnesses.

HENRY THOMAS.

Witnesses:
 E. C. MUNANT,
 A. SCOTT.